(12) United States Patent
Fujioka et al.

(10) Patent No.: US 8,900,359 B2
(45) Date of Patent: Dec. 2, 2014

(54) INK, INK CARTRIDGE, INK-JET RECORDING METHOD, AND METHOD FOR PREPARING INK

(75) Inventors: Fumiaki Fujioka, Kawasaki (JP); Hiromitsu Kishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 666 days.

(21) Appl. No.: 13/015,131

(22) Filed: Jan. 27, 2011

(65) Prior Publication Data

US 2011/0187787 A1 Aug. 4, 2011

(30) Foreign Application Priority Data

Jan. 29, 2010 (JP) ................................. 2010-017790

(51) Int. Cl.
*C09D 11/02* (2014.01)
*B41J 2/015* (2006.01)

(52) U.S. Cl.
CPC *B41J 2/015* (2013.01); *C09D 11/02* (2013.01)
USPC ...................................................... 106/31.6

(58) Field of Classification Search
USPC ........ 106/31.6, 410, 411, 493, 494, 495, 496, 106/497, 498
See application file for complete search history.

(56) References Cited

U.S. PATENT DOCUMENTS

| 2004/0024086 | A1 | 2/2004 | Segawa | |
|---|---|---|---|---|
| 2005/0284329 | A1 | 12/2005 | Jackson | |
| 2005/0284330 | A1* | 12/2005 | Jackson | 106/31.6 |
| 2006/0082629 | A1* | 4/2006 | Kato et al. | 347/100 |
| 2011/0189396 | A1* | 8/2011 | Kishi et al. | 427/256 |
| 2012/0050762 | A1* | 3/2012 | Konno et al. | 358/1.9 |

FOREIGN PATENT DOCUMENTS

| JP | 2003-306620 A | 10/2003 |
|---|---|---|
| JP | 2007-314805 A | 12/2007 |
| JP | 2007-331343 A | 12/2007 |
| JP | 2008-504399 T | 2/2008 |
| JP | 2008-504400 T | 2/2008 |
| JP | 2008-143135 A | 6/2008 |
| WO | 03/033602 A1 | 4/2003 |

OTHER PUBLICATIONS

Cab-O-Jet 270Y.*
Cab-O-Jet 260M.*

* cited by examiner

*Primary Examiner* — Veronica F Faison
(74) *Attorney, Agent, or Firm* — Canon U.S.A., Inc., IP Division

(57) ABSTRACT

An ink containing a plurality of organic pigments having hues forming an angle of 10 degrees or more with one another, wherein the bronze value B calculated by Formula 1 is 0.0 or more, and 12.0 or less, the saturation value C calculated by Formula 2 is 65.0 or more, and the 20-degree gloss value GB is 30.0 or more with respect to a predetermined recorded image recorded by the ink.

8 Claims, No Drawings

INK, INK CARTRIDGE, INK-JET RECORDING METHOD, AND METHOD FOR PREPARING INK

BACKGROUND OF THE INVENTION

1. Field of the Invention

The present invention relates to an ink, an ink cartridge, an ink-jet recording method, and a method for preparing an ink.

2. Description of the Related Art

In recent years, ink-jet recording technologies have been used in a wide range of fields, and an ink usable in various uses has been desired. Pigment inks, in which pigments are used as coloring materials, have been utilized especially in applications where the fastness property is taken very seriously. Regarding an ink-jet recording method, in order to realize a still wider color gamut, so-called special color inks, e.g., red, green, and blue, have become used for pigment inks as well in many cases.

However, the pigments have a specific issue that scattering of light occurs easily because the pigments are present as particles. In particular, in the case where a recording medium is glossy paper, there is an issue that a so-called bronze phenomenon occurs, in which an image recorded on the glossy paper glares in such a manner as metallic luster, or reflected light takes on a color different from the color intrinsic to the pigment depending on the observation angle of the recorded material. This bronze phenomenon is recognized remarkably in an image recorded by a cyan ink. According to the examination of the present inventors, the bronze phenomenon occurs with respect to not only the cyan ink, but also so-called special color inks having hues different from basic colors of subtractive mixture and, therefore, is an issue. Furthermore, this phenomenon becomes especially remarkable when the glossiness of the image is enhanced to improve the image quality. Therefore, it is a large issue to ensure the compatibility between high glossiness and suppression of bronze phenomenon of the image. Here, the bronze phenomenon can be suppressed by reducing the content of the pigment in the ink significantly. On the other hand, the color developability is degraded and, thereby, it becomes difficult to improve the image quality. That is, aspects of the present invention may address an issue to suppress the above-described bronze phenomenon assuming that the color developability of the image is high.

Regarding suppression of the bronze phenomenon of the image, for example, a proposal has been made, in which a polyether modified polysiloxane and a (co)polymer containing a sulfone group are added as a polymer emulsion to an ink (refer to Japanese Patent Laid-Open No. 2003-306620). Furthermore, there is a proposal related to an apparatus in which the bronze phenomenon of an image formed by superposing a plurality of inks can be suppressed through image processing to perform color separation in such a way as to minimize a bronze value (refer to Japanese Patent Laid-Open No. 2008-143135). Meanwhile, regarding enhancement of the color developability of an image, there are proposals related to inks containing a plurality of pigments (refer to PCT Japanese Translation Patent Publication No. 2008-504399 and Japanese Patent Laid-Open No. 2007-314805).

SUMMARY OF THE INVENTION

Aspects of the present invention provide an ink capable of recording a high-quality image exhibiting excellent color developability and excellent glossiness in combination while bronze phenomenon is suppressed. Aspects of the present invention further provide an ink cartridge and an ink-jet recording method capable of obtaining the above-described excellent image by using the above-described ink and, in addition, a method for preparing an ink, the method being capable of producing the above-described excellent ink.

An ink according to aspects of the present invention contains a plurality of organic pigments (hereafter may be referred to as "pigments") having hues forming an angle of 10 degrees or more with one another, wherein the bronze value B calculated by Formula 1 described below is 0.0 or more, and 12.0 or less, the saturation value C calculated by Formula 2 described below is 65.0 or more, and the 20-degree gloss value GB is 30.0 or more with respect to a predetermined recorded image recorded by the above-described ink.

$$a_{45}^* = 500\left[f\left(\frac{Xx_{45}}{Xs_{45}}\right) - f\left(\frac{Yx_{45}}{Ys_{45}}\right)\right],\quad\text{Formula 1}$$

$$b_{45}^* = 200\left[f\left(\frac{Yx_{45}}{Ys_{45}}\right) - f\left(\frac{Zx_{45}}{Zs_{45}}\right)\right]$$

$$B = (a_{45}^{*2} + b_{45}^{*2})^{\frac{1}{2}}$$

$Xx_{45}$, $Yx_{45}$, and $Zx_{45}$ are tristimulus values of reflected light of illumination in the direction of specular reflection. The illumination is in the direction of an angle of 45 degrees to a normal to the image. $Xs_{45}$, $Ys_{45}$, and $Zs_{45}$ are tristimulus values of illumination light under the same condition of the illumination. These tristimulus values satisfy the following formulas.

$$f\left(\frac{Xx_{45}}{Xs_{45}}\right) = \left(\frac{Xx_{45}}{Xs_{45}}\right)^{\frac{1}{3}} \text{ where } \frac{Xx_{45}}{Xs_{45}} > 0.008856$$

$$f\left(\frac{Xx_{45}}{Xs_{45}}\right) = 7.78\frac{Xx_{45}}{Xs_{45}} + \frac{16}{116} \text{ where } \frac{Xx_{45}}{Xs_{45}} \leq 0.008856$$

$$f\left(\frac{Yx_{45}}{Ys_{45}}\right) = \left(\frac{Yx_{45}}{Yx_{45}}\right)^{\frac{1}{3}} \text{ where } \frac{Yx_{45}}{Ys_{45}} > 0.008856$$

$$f\left(\frac{Yx_{45}}{Ys_{45}}\right) = 7.78\frac{Yx_{45}}{Ys_{45}} + \frac{16}{116} \text{ where } \frac{Yx_{45}}{Ys_{45}} \leq 0.008856$$

$$f\left(\frac{Zx_{45}}{Zs_{45}}\right) = \left(\frac{Zx_{45}}{Zs_{45}}\right)^{\frac{1}{3}} \text{ where } \frac{Zx_{45}}{Zs_{45}} > 0.008856$$

$$f\left(\frac{Zx_{45}}{Zs_{45}}\right) = 7.78\frac{Zx_{45}}{Zs_{45}} + \frac{16}{116} \text{ where } \frac{Zx_{45}}{Zs_{45}} \leq 0.008856$$

$$a_0^* = 500\left[f\left(\frac{Xx_0}{Xs_0}\right) - f\left(\frac{Yx_0}{Ys_0}\right)\right],\quad\text{Formula 2}$$

$$b_0^* = 200\left[f\left(\frac{Yx_0}{Ys_0}\right) - f\left(\frac{Zx_0}{Zs_0}\right)\right]$$

$$C = (a_0^{*2} + b_0^{*2})^{\frac{1}{2}}$$

$Xx_0$, $Yx_0$, and $Zx_0$ are tristimulus values of reflected light of illumination in the direction of a normal to the image. The illumination is in the direction of an angle of 45 degrees to the normal. $Xs_0$, $Ys_0$, and $Zs_0$ are tristimulus values of illumination light under the same condition of the illumination. These tristimulus values satisfy the following formulas.

$$f\left(\frac{Xx_0}{Xs_0}\right) = \left(\frac{Xx_0}{Xs_0}\right)^{\frac{1}{3}} \text{ where } \frac{Xx_0}{Xs_0} > 0.008856$$

$$f\left(\frac{Xx_0}{Xs_0}\right) = 7.78\frac{Xx_0}{Xs_0} + \frac{16}{116} \text{ where } \frac{Xx_0}{Xs_0} \leq 0.008856$$

-continued $$f\left(\frac{Yx_0}{Ys_0}\right) = \left(\frac{Yx_0}{Yx_0}\right)^{\frac{1}{3}} \text{ where } \frac{Yx_0}{Ys_0} > 0.008856$$

$$f\left(\frac{Yx_0}{Ys_0}\right) = 7.78\frac{Yx_0}{Ys_0} + \frac{16}{116} \text{ where } \frac{Yx_0}{Ys_0} \le 0.008856$$

$$f\left(\frac{Zx_0}{Zs_0}\right) = \left(\frac{Zx_0}{Zs_0}\right)^{\frac{1}{3}} \text{ where } \frac{Zx_0}{Zs_0} > 0.008856$$

$$f\left(\frac{Zx_0}{Zs_0}\right) = 7.78\frac{Zx_0}{Zs_0} + \frac{16}{116} \text{ where } \frac{Zx_0}{Zs_0} \le 0.008856$$

Furthermore, the aspects of the present invention relates to an ink cartridge and an ink-jet recording method by using the ink having the above-described configuration and, in addition, a method for preparing an ink having the above-described excellent characteristics.

According to aspects of the present invention, an ink capable of recording a high-quality image exhibiting excellent color developability and excellent glossiness while bronze phenomenon is suppressed and an ink cartridge and an ink-jet recording method by using the above-described ink are provided. According to aspects of the present invention, a method for preparing an ink is provided, the method being capable of producing the ink, which gives the above-described excellent image.

Further features of the present invention will become apparent from the following description of exemplary embodiments.

DESCRIPTION OF THE EMBODIMENTS

The present invention will be described below in more detail with reference to embodiments.

As a result of the examination by the present inventors, it was found that a recorded image did not ensure compatibility between a high level of glossiness and suppression of the bronze phenomenon while high color developability of the image is maintained by using any one of the above-described technologies in the related art, although this issue was addressed by aspects of the present invention.

Specifically, in the case where the polymer emulsion is contained as in the technology described in Japanese Patent Laid-Open No. 2003-306620, the bronze phenomenon is suppressed to some extent, but the polymer emulsion has particle diameters, so that the uniformity of the gloss is lost and variations become conspicuous. As a result, it is not said that the formed image has high glossiness as a whole image. Moreover, the polymer emulsion is included and, therefore, there is a concern about an influence on the reliability of ejection characteristics and the like of a recording head to eject an ink.

Japanese Patent Laid-Open No. 2008-143135 states that the bronze phenomenon in the image recorded by superposing a plurality of inks is suppressed. However, regarding some one type of ink, suppression of the bronze phenomenon in itself in the image recorded by using the ink concerned is not noted.

In the case where an ink is produced by simply containing a plurality of pigments for the purpose of obtaining high color developability, as shown in PCT Japanese Translation Patent Publication No. 2008-504399, an image obtained by using this has a large pigment content and, thereby, the glossiness of the image is degraded. Furthermore, in the case where an ink contains a plurality of pigments at low concentrations to adjust the color, as in Japanese Patent Laid-Open No. 2007-314805, high color developability cannot be achieved and, in addition, the gloss value increases simply. Consequently, there is a problem in that the bronze phenomenon is recognized remarkably.

Initially, the bronze value specified according to aspects of the present invention will be described in detail. As described above, the bronze phenomenon refers to a phenomenon in which the reflected light is observed to take on a color different from the color intrinsic to the pigment. The present inventors considered that expression of the color of the bronze phenomenon by an index was important to suppress the bronze phenomenon. Then, it was found that the color of specular reflected light relative to incident light from the direction of an angle of 45 degrees with respect to an image was expressed by an index. This is based on the fact that the bronze phenomenon appears most remarkably with respect to the specular reflected light relative to incident light from the direction of an angle of 45 degrees. In this regard, the specular reflected light results from perfect reflection of light by a mirror or the like, and the incident angle and the reflection angle of the light are the same angle with respect to a reflection surface. That is, the specular reflected light of the light incident from the direction of an angle of 45 degrees is light reflected at an equal angle of 45 degrees with respect to the reflection surface. Meanwhile, as for the technique to express the color by an index, in general, the calculation technique in the CIELab colorimetric system recommended by Commission Internationale de l'Eclairage is used. Regarding aspects of the present invention, as for the evaluation index of the color of the bronze phenomenon, a new technique was found, in which the value of color, that is, the "bronze value" calculated on the basis of only the specular reflected light relative to the incident light from the direction of an angle of 45 degrees and on the basis of the calculation technique in the CIELab colorimetric system was specified with respect to one ink. The detailed calculation method of the bronze value will be described later. Consequently, the color of the bronze phenomenon can be calculated appropriately, and the bronze phenomenon can be controlled by controlling the bronze value. Therefore, the bronze value is examined and controlled in the stage of ink design and, thereby, the bronze phenomenon in the image formed by the ink concerned can be suppressed.

Here, terms used according to aspects of the present invention are defined. The term "predetermined recorded image" refers to a solid image recorded on ink-jet glossy paper, in which a porous ink receiving layer containing an inorganic pigment and a binder is provided on a gas-permeable substrate (paper or the like), with a recording duty of 100% by using one ink. The above-described glossy paper may be a recording medium having surface glossiness within a common range. For example, glossy paper having a 20-degree gloss value measured under the condition of the incident angle of 20 degrees and the reflection angle of 20 degrees of preferably 10.0 or more, and 50.0 or less can be used. Furthermore, glossy paper having a 20-degree gloss value of more preferably 30.0 or more, and 50.0 or less can be used. The term "recorded image with a recording duty of 100%" refers to an image provided with one droplet of ink having a mass of 4.5 ng per droplet in a unit region of $\frac{1}{1,200}$ inch×$\frac{1}{1,200}$ inch where the resolution is 1,200 dpi×1,200 dpi.

According to aspects of the present invention, the term "bronze value B" refers to a value calculated with reference to the color calculation technique in the CIELab calorimetric system on the basis of the measurement performed in a manner described below. Initially, the measurement is performed by using a goniophotometer under the condition of the light source of D65, the view angle of 2 degrees, the incident angle of 45 degrees, the reflection angle of 45 degrees, and the flapping angle of 0 degrees and, thereby, calculates the tristimulus values of the reflected light and the illumination light. In the examples described later, "Gonio-Spectrophotometric Color measurement system" (Model GCMS-3B; produced by MURAKAMI COLOR RESEARCH LABORATORY) was used. The tristimulus value of the reflected light is determined from the spectral intensity of the reflected light obtained in the measurement of the "predetermined recorded image" defined as described above with the goniophotometer under the above-described condition. The tristimulus value of the illumination light is determined from the spectral intensity of the illumination light obtained in the measurement of barium sulfate, which is also used as a white correction plate of a goniophotometer, under the above-described condition with the goniophotometer. Then, the individual tristimulus values are used and, thereby, the "bronze value B" of the recorded image with recording duty of 100% is calculated on the basis of Formula 1 described below.

$$a_{45}^* = 500\left[f\left(\frac{Xx_{45}}{Xs_{45}}\right) - f\left(\frac{Yx_{45}}{Ys_{45}}\right)\right], \quad \text{Formula 1}$$

$$b_{45}^* = 200\left[f\left(\frac{Yx_{45}}{Ys_{45}}\right) - f\left(\frac{Zx_{45}}{Zs_{45}}\right)\right]$$

$$B = (a_{45}^{*2} + b_{45}^{*2})^{\frac{1}{2}}$$

($Xx_{45}$, $Yx_{45}$, and $Zx_{45}$ are tristimulus values of reflected light of illumination in the direction of specular reflection. The illumination is in the direction of an angle of 45 degrees to a normal to the image. $Xs_{45}$, $Ys_{45}$, and $Zs_{45}$ are tristimulus values of illumination light under the same condition of the illumination. These tristimulus values satisfy the following formulas. Regarding the color calculation technique in the CIELab calorimetric system, values of a* and b* can be approximately calculated by substituting the following formulas into Formula 1.)

$$f\left(\frac{Xx_{45}}{Xs_{45}}\right) = \left(\frac{Xx_{45}}{Xs_{45}}\right)^{\frac{1}{3}} \text{ where } \frac{Xx_{45}}{Xs_{45}} > 0.008856$$

$$f\left(\frac{Xx_{45}}{Xs_{45}}\right) = 7.78\frac{Xx_{45}}{Xs_{45}} + \frac{16}{116} \text{ where } \frac{Xx_{45}}{Xs_{45}} \leq 0.008856$$

$$f\left(\frac{Yx_{45}}{Ys_{45}}\right) = \left(\frac{Yx_{45}}{Ys_{45}}\right)^{\frac{1}{3}} \text{ where } \frac{Yx_{45}}{Ys_{45}} > 0.008856$$

$$f\left(\frac{Yx_{45}}{Ys_{45}}\right) = 7.78\frac{Yx_{45}}{Ys_{45}} + \frac{16}{116} \text{ where } \frac{Yx_{45}}{Ys_{45}} \leq 0.008856$$

$$f\left(\frac{Zx_{45}}{Zs_{45}}\right) = \left(\frac{Zx_{45}}{Zs_{45}}\right)^{\frac{1}{3}} \text{ where } \frac{Zx_{45}}{Zs_{45}} > 0.008856$$

$$f\left(\frac{Zx_{45}}{Zs_{45}}\right) = 7.78\frac{Zx_{45}}{Zs_{45}} + \frac{16}{116} \text{ where } \frac{Zx_{45}}{Zs_{45}} \leq 0.008856$$

The "saturation value C" according to aspects of the present invention refers to a value calculated with reference to the color calculation technique in the CIELab calorimetric system on the basis of the measurement performed in the following manner in conformity with JIS Z 8729. Initially, the measurement is performed by using a goniophotometer under the condition of the light source of D65, the view angle of 2 degrees, the incident angle of 45 degrees, the reflection angle of 0 degrees, and the flapping angle of 0 degrees. In the examples described later, "Gonio-Spectrophotometric Color measurement system" (Model GCMS-3B; produced by MURAKAMI COLOR RESEARCH LABORATORY) was used. The tristimulus values of the reflected light and the illumination light are calculated in a manner similar to the method for measuring the above-described bronze value B. Then, the individual tristimulus values are used and, thereby, the "saturation values C" of the recorded image with recording duty of 100% is calculated on the basis of Formula 2 described below.

$$a_0^* = 500\left[f\left(\frac{Xx_0}{Xs_0}\right) - f\left(\frac{Yx_0}{Ys_0}\right)\right], \quad \text{Formula 2}$$

$$b_0^* = 200\left[f\left(\frac{Yx_0}{Ys_0}\right) - f\left(\frac{Zx_0}{Zs_0}\right)\right]$$

$$C = (a_0^{*2} + b_0^{*2})^{\frac{1}{2}}$$

($Xx_0$, $Yx_0$, and $Zx_0$ are tristimulus values of reflected light of illumination in the direction of a normal to the image. The illumination is in the direction of an angle of 45 degrees to the normal. $Xs_0$, $Ys_0$, and $Zs_0$ are tristimulus values of illumination light under the same condition of the illumination. These tristimulus values satisfy the following formulas. Regarding the color calculation technique in the CIELab calorimetric system, the values of a* and b* can be approximately calculated by substituting the following formulas into Formula 2.)

$$f\left(\frac{Xx_0}{Xs_0}\right) = \left(\frac{Xx_0}{Xs_0}\right)^{\frac{1}{3}} \text{ where } \frac{Xx_0}{Xs_0} > 0.008856$$

$$f\left(\frac{Xx_0}{Xs_0}\right) = 7.78\frac{Xx_0}{Xs_0} + \frac{16}{116} \text{ where } \frac{Xx_0}{Xs_0} \leq 0.008856$$

$$f\left(\frac{Yx_0}{Ys_0}\right) = \left(\frac{Yx_0}{Ys_0}\right)^{\frac{1}{3}} \text{ where } \frac{Yx_0}{Ys_0} > 0.008856$$

$$f\left(\frac{Yx_0}{Ys_0}\right) = 7.78\frac{Yx_0}{Ys_0} + \frac{16}{116} \text{ where } \frac{Yx_0}{Ys_0} \leq 0.008856$$

$$f\left(\frac{Zx_0}{Zs_0}\right) = \left(\frac{Zx_0}{Zs_0}\right)^{\frac{1}{3}} \text{ where } \frac{Zx_0}{Zs_0} > 0.008856$$

$$f\left(\frac{Zx_0}{Zs_0}\right) = 7.78\frac{Zx_0}{Zs_0} + \frac{16}{116} \text{ where } \frac{Zx_0}{Zs_0} \leq 0.008856$$

According to aspects of the present invention, the "20-degree gloss value GB" refers to a value measured by using a glossmeter (in the examples described later, "Microhazemeter" (produced by BYK-Gardner) was used) under the condition of the incident angle of 20 degrees and the reflection angle of 20 degrees.

The present inventors performed detailed examination on various images by the above-described method. As a result, it was found that an image exhibiting compatibility between a high level of glossiness and suppression of the bronze phenomenon while high color developability was maintained was able to be realized reliably, as expected by aspects of the present invention, in the case where the above-described individual values were within specific ranges. That is, it was found that an image formed by an ink containing a plurality of pigments having hues forming an angle of 10 degrees or more with one another became the above-described excellent image in the case where the bronze value B was 0.0 or more, and 12.0 or less, the saturation value C was 65.0 or more, and the 20-degree gloss value GB was 30.0 or more. Put another way, if the ink can be configured in such a way that the ink image has the above-described optical characteristics, an image which is not achieved by the technology in the related art and which is expected by aspects of the present invention can be obtained easily and reliably.

With respect to an image formed by a pigment ink, the developments behind the configuration, which satisfies the above-described three points, according to aspects of the present invention will be described. Initially, in order to address the issue, the present inventors formed images by using various types of pigment inks having different compositions and performed detailed examination on the bronze phenomenon appeared in the images. In the course thereof, the above-described "bronze values B" of the images recorded with the inks by using various pigments were measured. As a result, remarkable bronze phenomena were recognized with respect to inks other than the cyan ink containing a copper phthalocyanine based pigment, which is known for its remarkable bronze phenomenon. In particular, it was found that the bronze phenomenon was remarkable with respect to the image in the case where a special color ink was used, the special color ink being used for the purpose of high color developability and reproduction of a wide color range of the image. Hereafter a simple term "ink" refers to a "pigment ink".

Subsequently, the present inventors performed examination variously with respect to inks containing a polymer emulsion and the like, which were believed previously to suppress the bronze phenomenon. As a result, an effect of suppressing the bronze phenomenon was exerted to some extent, but the gloss values of the various inks were reduced. The result depended on the amount of application of the ink, and the levels of reduction in gloss value were different depending on the ink species, so that variations in glossiness occurred. That is, it was found that the bronze phenomenon was able to be suppressed to some extent by the technique through the use of the polymer emulsion in the related art, but a high level of image expected by aspects of the present invention was not obtained. The reason for this is estimated that the above-described technique noted only the bronze phenomenon and, therefore, the compatibility with the glossiness was not reached.

On the other hand, the present inventors performed examination variously by forming images through the use of inks containing a plurality of pigments, which were believed previously to improve the color developability. An improvement of the color developability was ascertained, but an image satisfying required levels of all of the bronze characteristics and the glossiness was not obtained. That is, it was found that a high level of image expected by aspects of the present invention was not obtained. The reason for this is estimated that the above-described technique attached primary importance to only the color developability and, therefore, the compatibility with the other performances was not reached.

Then, in order to obtain an excellent image at a high level expected by aspects of the present invention, the present inventors performed examination variously in consideration of all requirements for the bronze characteristics, the glossiness, and the color developability. Initially, individual images were formed by inks containing various pigments, and the bronze values were measured. As a result, it was found that the resulting images had bronze light with a color different from one another depending on the pigment species. Consequently, the present inventors considered that the bronze phenomenon was able to be suppressed without exerting an influence on the color developability and the like of the image by effecting whitening through additive mixture rather than subtractive mixture from the viewpoint of the bronze light being reflected light. This can be made possible by the ink which is specified according to aspects of the present invention and which provides an image satisfying the requirements with respect to the bronze value B, the saturation value C, and the 20-degree gloss value. The details thereof will be described later. The major feature according to aspects of the present invention resides in the point that an ink capable of forming an image satisfying all requirements for the bronze characteristics, the glossiness, and the color developability can be provided by not only noting the color of the subtractive mixture, which is the idea in the related art, but also the color of bronze light (specular reflected light) of the various pigments.

The present inventors performed further examination on the basis of the above-described findings. As a result, it was found that the bronze phenomenon was able to be suppressed dramatically by using not only a pigment having bronze light of a complementary color, but also pigments having various bronze light in combination with a pigment having specific bronze light. Regarding this point, the present inventors estimate that use of pigments having various bronze light in combination was the additive mixture and, therefore, a plurality of bronze light were mixed to approach white light and, as a result, the bronze phenomenon was able to be suppressed dramatically.

As a matter of course, the magnitude of the B value of the bronze light is closely correlated with the GB value indicating the glossiness. This is because if the GB value which is the intensity of the specular reflected light increases, the B value of the bronze light increases inevitably. Consequently, the bronze value B hitherto increased with increase in GB value.

However, according to aspects of the present invention, the colors of bronze light cancel each other out through the combination of a plurality of different pigments, so that even when the GB value remains high, the bronze value does not increase, and there is no proportionality in contrast to that in the related art. Consequently, as described above, with respect to the resulting image, the compatibility between a high level of bronze suppression effect and the glossiness can be ensured. As a matter of course, high color developability can be maintained by noting the color due to subtractive mixture as in the related art.

The present inventors performed further examination on the basis of the above-described three points. As a result, it was determined that an optimum configuration is to satisfy $0.0 \leq B \leq 12.0$, $C \geq 65.0$, and $GB \geq 30.0$. In the case where a plurality of pigments are selected in such a way as to satisfy the above-described relationships, the image formed by the ink containing the plurality of pigments having hues forming an angle of 10 degrees or more with one another has a high level of image quality. It is more preferable that the bronze value B satisfies $0.0 \leq B \leq 8.0$.

Ink

The individual components constituting the ink according to aspects of the present invention will be described below.

Organic Pigment

Coloring materials constituting the ink according to aspects of the present invention are organic pigments having hues forming an angle of 10 degrees or more with one another. According to aspects of the present invention, the angle formed by hues is assumed to be an absolute value. The combination of the plurality of pigments is only required to satisfy that the above-described bronze value B is 0.0 or more, and 12.0 or less, the saturation value C is 65.0 or more, and the 20-degree gloss value GB is 30.0 or more. The plurality of pigments having hues forming an angle of 10 degrees or more with one another are used because of the following reason. As described above, aspects of the present invention address solution of the bronze phenomenon with respect to the special color ink. However, even when a plurality of pigments having hues forming an angle of less than 10 degrees with one another are contained in an ink, the color tone serving as the special color ink (an ink having a hue different from any one of cyan, magenta, and yellow, which are basic colors of subtractive mixture) is not obtained easily. The angles formed by hues of the plurality of pigments with one another are preferably 180 degrees or less. The hue angles of pigments are described in various literatures, e.g., "Yuuki Ganryou Handobukku (Organic Pigment Handbook)" issued by COLOR OFFICE Co., Ltd., 2006. The angle formed by hues can be calculated as the difference between the hue angles of two pigments. Any combination selected from the following coloring materials can be employed insofar as the above-described conditions are satisfied with respect to a predetermined recorded image recorded by the ink containing pigments having hues forming an angle of 10 degrees or more with one another.

According to further examination of the present inventors, regarding the ink according to aspects of the present invention containing the pigments having hues forming an angle of 10 degrees or more with one another, the pigments can be selected in a manner as described below. Initially, a control ink formed in a manner similar to the above-described ink except that one of the "pigments having hues forming angles of 10 degrees or more with one another" in the ink according to aspects of the present invention is contained and adjustment is performed with water is prepared. For example, the case where the ink according to aspects of the present invention contains two types of pigments (A and B) having different hues is as described below. In the case where the ink according to aspects of the present invention contains a percent by mass of pigment A, b percent by mass of pigment B, c percent by mass of water, and d percent by mass of other constituents, the "control inks" refer to the following two types of inks. They are an ink containing a percent by mass of pigment A, c+b percent by mass of water, and d percent by mass of other constituents and an ink containing b percent by mass of pigment B, c+a percent by mass of water, and d percent by mass of other constituents. Likewise, in the case where the ink according to aspects of the present invention contains three or more types of pigments having different hues, the number of the "control inks" present is equal to the number of pigments. Furthermore, the ink can contain the pigment A and the pigment B in such a way that with respect to individual "predetermined recorded images" recorded by these control inks, the relationships $B_A > B_B$ and $GB_A < GB_B$ are satisfied, where the bronze values of the individual images are assumed to be $B_A$ and $B_B$, respectively, and the GB values of the individual images are assumed to be $GB_A$ and $GB_B$, respectively. This is because in the case where a configuration in which the glossiness of the pigment of relatively high level of suppression of the bronze phenomenon is higher than the glossiness of the pigment of relatively low level of suppression of the bronze phenomenon is employed, the bronze of the ink containing the pigments A and B is canceled easily. For details, it is estimated that if the glossiness is high, the bronze light becomes large and is canceled easily. Furthermore, since canceling becomes easy, effects can be obtained, that is, the required pigment concentration becomes low, and the glossiness is enhanced. In the above description, $B_A > B_B$ holds and, therefore, the pigment having a relatively large bronze value is assumed to be the pigment A, and the pigment having a relatively small bronze value is assumed to be the pigment B. The very thing that has achieved this is the technical idea according to aspects of the present invention, in which a color of bronze light of the plurality of pigments as a whole is allowed to become not recognized easily by whitening of a plurality of bronze light in accordance with the plurality of pigments having different hues through additive mixture rather than by suppression of generation in itself of the bronze light.

In the examples according to aspects of the present invention, only the bronze value of the control ink having a pigment content of 3.0 percent by mass is used because of the following reason. From the standpoint of the relationship between the pigment content in the ink and the glossiness of the image, in general, in the case where the pigment content is small, the glossiness is high, and in the case where the pigment content is large, the glossiness is low. Meanwhile, from the standpoint of the relationship between the pigment content in the ink and the probability of occurrence of bronze phenomenon of the image, in the case where the pigment content is small, the pigment in itself, which causes bronze, is reduced, so that a bronze phenomenon does not occur easily. Conversely, in the case where the bronze content is large, a bronze phenomenon occurs easily. Against the above-described background, according to the examination of the present inventors, it was made clear that regarding the bronze value, which was influenced by both the glossiness and the probability of occurrence of a bronze phenomenon, there was a tendency of the value not to change significantly even when the pigment content increased or decreased. Therefore, ascertainment by using only the bronze value with respect to the control ink having a pigment content of 3.0 percent by mass is enough in aspect of the present invention.

According to aspects of the present invention, the total content (percent by mass) of the pigments in the ink is preferably 2.0 percent by mass or more, and 10.0 percent by mass or less with reference to the total mass of the ink. If the total content of the pigments is less than 2.0 percent by mass, sufficient color developability is not obtained in some cases. On the other hand, if the total content of the pigments exceeds 10.0 percent by mass, the reliability, e.g., ejection stability of ink-jet method recording head, of the ink is not obtained sufficiently in some cases. The mass ratio of the content of the pigment having the largest content (major pigment) in the plurality of pigments having hues forming angles of 10 degrees or more with one another in the ink to the (total) content of pigments other than the major pigment is preferably within the range of 4:1 to 1:1.

Furthermore, according to aspects of the present invention, the value of hue angle of the ink containing a plurality of organic pigments having hues forming angles of 10 degrees or more with one another is preferably within the range of 0 degrees or more, and 150 degrees or less. The "hue angle of an ink" according to aspects of the present invention is calculated by the following method. Initially, an image with a recording duty of 100% is obtained by using an ink containing a plurality of organic pigments having hues forming angles of 10 degrees or more with one another. Regarding the resulting image, a* and b* in the L*a*b* colorimetric system prescribed by Commission Internationale de l'Eclairage (CIE) are measured. Subsequently, a hue angle (H°) is calculated from the resulting values of a* and b* on the basis of Formula 3 described below. In this regard, the values of the above-described a* and b* can be measured by using, for example, a spectrophotometer (trade name: Spectrolino; produced by Gretag Macbeth). As a matter of course, aspects of the present invention are not limited to this.

$$H°=\tan^{-1}(b*/a*), \text{ where } a* \geq 0, b* \geq 0 \text{ (first quadrant)}$$

$$H°=180+\tan^{-1}(b*/a*), \text{ where } a* \leq 0, b* \leq 0 \text{ (second quadrant)}$$

$H°=180+\tan^{-1}(b*/a*)$, where $a*≤0$, $b*≤0$ (third quadrant)

$H°=360+\tan^{-1}(b*/a*)$, where $a*≥0$, $b*≥0$ (fourth quadrant)  Formula 3

Specific examples of organic pigments include water-insoluble azo pigments, e.g., Toluidine Red, Toluidine Maroon, Hansa Yellow, Benzidine Yellow, and Pyrazolone Red, water-soluble azo pigments, e.g., Lithol Red, Helio Bordeaux, Pigment Scarlet, and Permanent Red 2B, derivatives from vat dyes, e.g., alizarin, indanthrone, and thioindigo maroon, phthalocyanine based pigments, e.g., Phthalocyanine Blue and Phthalocyanine Green, quinacridone based pigments, e.g., Quinacridone Red and Quinacridone Magenta, perylene based pigments, e.g., Perylene Red and Perylene Scarlet, isoindolinone based pigments, e.g., Isoindolinone Yellow and Isoindolinone Orange, imidazolone based pigments, e.g., Benzimidazolone Yellow, Benzimidazolone Orange, and Benzimidazolone Red, pyranthrone based pigments, e.g., Pyranthrone Red, and Pyranthrone Orange, indigo based pigments, condensed azo based pigments, thioindigo based pigments, diketo-pyrrolo-pyrrole based pigments, Flavanthrone Yellow, Acylamide Yellow, Quinophthalone Yellow, Nickel Azo Yellow, Copper Azomethine Yellow, Perinone Orange, Anthrone Orange, Dianthraquinonyl Red, and Dioxazine Violet.

Examples of organic pigments usable according to aspects of the present invention include, on a color index (C. I.) number basis, C. I. Pigment Yellow: 12, 13, 14, 17, 20, 24, 74, 83, 86, 93, 97, 109, 110, 117, 120, 125, 128, 137, 138, 147, 148, 150, 151, 153, 154, 166, 168, 180, and 185, C. I. Pigment Orange: 16, 36, 43, 51, 55, 59, 61, and 71, C. I. Pigment Red: 9, 48, 49, 52, 53, 57, 97, 122, 123, 149, 168, 175, 176, 177, 180, 192, 215, 216, 217, 220, 223, 224, 226, 227, 228, 238, 240, 254, 255, and 272, C. I. Pigment Violet: 19, 23, 29, 30, 32, 37, 40, and 50, C. I. Pigment Blue: 15, 15:1, 15:3, 15:4, 15:6, 22, 60, and 64, C. I. Pigment Green: 7 and 36, and C. I. Pigment Brown: 23, 25, and 26.

As for a dispersion system of the pigment used in preparation of the ink according to aspects of the present invention, any previously known system described below can be applied. Examples include polymer dispersion pigments by using polymer dispersing agents, microcapsule type pigments in which pigment particles are incorporated in the polymer substantially, polymer bonding type pigments in which organic groups containing a polymer are bonded to surfaces of pigment particles, and self-dispersing pigments in which hydrophilic groups are bonded to surfaces of pigment particles. As a matter of course, these pigments having different dispersion systems can be used in combination.

According to aspects of the present invention, as for the polymer dispersing agent to disperse the pigment into the ink and polymers added to the ink for the purpose of improving the glossiness and the like of the recorded image, any polymer can be used insofar as the polymer has water solubility. Specific examples include copolymers in the form of block, random, graft, or the like and salts thereof synthesized from at least two monomers (at least one of them is a hydrophilic monomer) selected from the following monomers and derivatives thereof. Examples of monomers include styrene and derivatives thereof, vinyl naphthalene and derivatives thereof, aliphatic alcohol esters of α,β-ethylenic unsaturated carboxylic acid, acrylic acid and derivatives thereof, maleic acid and derivatives thereof, itaconic acid and derivatives thereof, fumaric acid and derivatives thereof, vinyl acetate, vinyl pyrrolidone, and acrylamide. Furthermore, natural polymers, e.g., rosin, shellac, and starch, can also be used. The polymer to disperse the pigment can be an alkali-soluble polymer, that is, a polymer having an anionic group. The above-described polymer has a weight average molecular weight of preferably 1,000 or more, and 30,000 or less, and furthermore 3,000 or more, and 15,000 or less and the acid value thereof is preferably 50 mgKOH/g or more, and 300 mgKOH/g or less. The polymer content (percent by mass) in the ink is preferably 0.1 percent by mass or more, and 10.0 percent by mass or less with reference to the total mass of the ink.

Aqueous Medium

The ink according to the present invention can contain an aqueous medium which is a mixed solvent of water and a water-soluble organic solvent. As for the water-soluble organic solvent, any one of solvents, e.g., monohydric or polyhydric alcohols, glycols, glycol ethers, and heterocyclic compounds, which have been used for ink-jet ink previously, can be used. The content (percent by mass) of the water-soluble organic solvent in the ink is preferably 3.0 percent by mass or more, and 50.0 percent by mass or less with reference to the total mass of the ink. The water content (percent by mass) in the ink is preferably 50.0 percent by mass or more, and 95.0 percent by mass or less with reference to the total mass of the ink.

Other Components

The ink according to aspects of the present invention may contain water-soluble organic compounds, e.g., urea, urea derivatives, trimethylol propane, and trimethylol ethane, which are solid at ambient temperature, besides the above-described components. The content (percent by mass) of the water-soluble organic compounds, which are solid at ambient temperature, in the ink is preferably 0.1 percent by mass or more, and 20.0 percent by mass or less, and more preferably 3.0 percent by mass or more, and 10.0 percent by mass or less with reference to the total mass of the ink. Furthermore, as necessary, the ink according to aspects of the present invention may contain various additives, e.g., a pH regulator, a rust inhibitor, a fungicide, an antioxidant, and a reduction inhibitor, besides the above-described components.

Ink-Jet Recording Method

An ink-jet recording method according to aspects of the present invention includes the step of ejecting the above-described ink according to aspects of the present invention from an ink-jet method recording head to perform recording on a recording medium. As for the ink-jet method, there is a system in which ink is ejected by applying thermal energy or mechanical energy to the ink. Regarding aspects of the present invention, in particular, the recoding method by using the thermal energy can be employed because more remarkable effects can be obtained. Known steps may be employed as the steps of the ink-jet recording method except that the ink according to the aspects of the present invention is used. According to aspects of the present invention, the term "recording" includes the form in which recording is performed on a recording medium, e.g., a recording medium having an ink receiving layer and normal paper, and a form in which printing is performed on a nonpermeable recording medium, e.g., glass, plastic, and film.

Ink Cartridge

The ink cartridge according to aspects of the present invention includes an ink storage portion to store an ink, wherein the above-described ink according to aspects of the present invention is stored in the above-described ink storage portion. As for the structure of the ink cartridge, a structure in which the ink storage portion is formed from an ink containing chamber to store the ink in a space in the inside thereof and a negative pressure generation member-holding chamber to store a negative pressure generating member to hold the ink in the inside thereof through the use of a negative pressure generated by an absorber or the like is mentioned. Alternatively, the ink cartridge may include an ink storage portion which does not have the ink containing chamber to store the ink in a space in the inside thereof, but which is configured to hold the whole ink to be stored by the negative pressure generating member. Furthermore, a bag-shaped ink storage portion, which stores the ink by being provided with a force in the direction to expand the internal volume thereof with a spring member or the like, may be employed. A form in which the ink cartridge having these configurations is further integrated with a recording head may be employed.

EXAMPLES

Aspects of the present invention will be described below in further detail with reference to examples and comparative examples. However, the present invention is not limited to the following examples within the bounds of not departing from the gist thereof. By the way, in the following description, the terms "part" and "%" are on a mass basis, unless otherwise specified.

Preparation of Pigment Dispersion

Mixing of 15 parts of pigment, 10 parts of polymer dispersing agent, and 80 parts of ion-exchanged water shown in Table 1 described below was performed, and dispersing was performed by using a batch vertical type sand mill for 3 hours. Thereafter, coarse particles were removed by a centrifugal separation treatment. Subsequently, pressure filtration was performed with a microfilter (produced by FUJIFILM Corporation) having a pore size of 3.0 μm, adjustment was performed with water in such a way that the pigment content became 10.0% and, thereby, individual pigment dispersions were prepared. As for the polymer dispersing agent, an aqueous solution obtained by neutralizing a styrene-acrylic acid copolymer having a weight average molecular weight of 10,000 and an acid value of 200 mgKOH/g with 10% sodium hydroxide aqueous solution was used.

TABLE 1

Pigment species used for preparing pigment dispersion

| Type of pigment dispersion | Pigment species | Hue angle of pigment (degree) |
|---|---|---|
| Cyan pigment dispersion 1 | C.I. Pigment Blue 15:3 | 243 |
| Magenta pigment dispersion | C.I. Pigment Red 122 | 343 |
| Yellow pigment dispersion 1 | C.I. Pigment Yellow 74 | 88 |
| Yellow pigment dispersion 2 | C.I. Pigment Yellow 128 | 94 |
| Red pigment dispersion | C.I. Pigment Red 149 | — |
| Green pigment dispersion | C.I. Pigment Green 7 | 180 |
| Blue pigment dispersion | C.I. Pigment Violet 23 | 300 |
| Cyan pigment dispersion 2 | C.I. Pigment Blue 15:4 | 242 |

Preparation of Ink

The pigment dispersions obtained as described above were used, and inks of Examples and Comparative examples according to aspects of the present invention and the respective control inks in accordance with these inks were prepared. The individual components (unit: %) shown in Table 2, Table 3-1, and Table 3-2 described below were mixed and agitated sufficiently. Thereafter, pressure filtration was performed with a filter (product name: HDCII; produced by Pall Corporation) having a pore size of 1.2 μm to prepare the individual inks. A polyethylene glycol having an average molecular weight of 1,000 was used. Acetylenol E100 was a nonionic surfactant (produced by Kawaken Fine Chemicals Co., Ltd.).

TABLE 2

Composition of control ink (unit: %)

| | Ink No. | | | |
|---|---|---|---|---|
| | 1 | 2 | 3 | 4 |
| Cyan pigment dispersion | 30.0 | | | |
| Magenta pigment dispersion | | 30.0 | | |
| Yellow pigment dispersion 1 | | | 30.0 | |
| Yellow pigment dispersion 2 | | | | 30.0 |
| Glycerin | 5.0 | 5.0 | 5.0 | 5.0 |
| Polyethylene glycol | 5.0 | 5.0 | 5.0 | 5.0 |
| 1,2-Hexanediol | 2.0 | 2.0 | 2.0 | 2.0 |
| 2-Pyrrolidone | 5.0 | 5.0 | 5.0 | 5.0 |
| Acetylenol E100 | 1.0 | 1.0 | 1.0 | 1.0 |
| Pure water | 52.0 | 52.0 | 52.0 | 52.0 |

TABLE 3-1

Composition of ink of Example (unit: %)

| | Example | | | | | |
|---|---|---|---|---|---|---|
| | 1 | 2 | 3 | 4 | 5 | 6 |
| Cyan pigment dispersion 1 | A: 10.0 | A: 10.0 | | | A: 10.0 | A: 10.0 |
| Magenta pigment dispersion | B: 25.0 | B: 35.0 | A: 15.0 | A: 15.0 | | |
| Yellow pigment dispersion 1 | | | B: 7.5 | B: 30.0 | B: 35.0 | |
| Yellow pigment dispersion 2 | | | | | | B: 35.0 |
| Red pigment dispersion | | | | | | |
| Green pigment dispersion | | | | | | |
| Blue pigment dispersion | | | | | | |
| Cyan pigment dispersion 2 | | | | | | |
| Glycerin | 5.0 | 5.0 | 5.0 | 5.0 | 5.0 | 5.0 |
| Polyethylene glycol | 5.0 | 5.0 | 5.0 | 5.0 | 5.0 | 5.0 |
| 1,2-Hexanediol | 2.0 | 2.0 | 2.0 | 2.0 | 2.0 | 2.0 |
| 2-Pyrrolidone | 5.0 | 5.0 | 5.0 | 5.0 | 5.0 | 5.0 |
| Acetylenol E100 | 1.0 | 1.0 | 1.0 | 1.0 | 1.0 | 1.0 |
| Pure water | 47.0 | 37.0 | 59.5 | 37.0 | 37.0 | 37.0 |

TABLE 3-2

Composition of ink of Comparative example (unit: %)

| | Comparative example | | | | | | | |
|---|---|---|---|---|---|---|---|---|
| | 1 | 2 | 3 | 4 | 5 | 6 | 7 | 8 |
| Cyan pigment dispersion 1 | | A: 20.0 | A: 10.0 | | | | | A: 5.0 |
| Magenta pigment dispersion | A: 15.0 | | | | | | | |
| Yellow pigment dispersion 1 | B: 4.0 | B: 10.0 | | | | | | |
| Yellow pigment dispersion 2 | | | B: 40.0 | | | | | |
| Red pigment dispersion | | | | 30.0 | | | | |
| Green pigment dispersion | | | | | 30.0 | | | |
| Blue pigment dispersion | | | | | | 30.0 | A: 15.0 | B: 5.0 |
| Cyan pigment dispersion 2 | | | | | | | B: 15.0 | |
| Glycerin | 5.0 | 5.0 | 5.0 | 5.0 | 5.0 | 5.0 | 5.0 | 5.0 |
| Polyethylene glycol | 5.0 | 5.0 | 5.0 | 5.0 | 5.0 | 5.0 | 5.0 | 5.0 |
| 1,2-Hexanediol | 2.0 | 2.0 | 2.0 | 2.0 | 2.0 | 2.0 | 2.0 | 2.0 |
| 2-Pyrrolidone | 5.0 | 5.0 | 5.0 | 5.0 | 5.0 | 5.0 | 5.0 | 5.0 |
| Acetylenol E100 | 1.0 | 1.0 | 1.0 | 1.0 | 1.0 | 1.0 | 1.0 | 1.0 |
| Pure water | 63.0 | 52.0 | 32.0 | 52.0 | 52.0 | 52.0 | | |

Evaluation

Measurement of Individual Values of Control Inks 1 to 4

Each of Control inks 1 to 4 obtained as described above was filled in an ink cartridge. The ink cartridge was set at the position of a cyan ink in an ink-jet recoding apparatus (trade name: BJF900; produced by CANON KABUSHIKI KAISHA). Each of solid images with recording duty of 100% was recorded on a recording medium (Premium glossy paper (thick); produced by CANON KABUSHIKI KAISHA) through 8-pass two-way recording, so that a "predetermined image" formed from each control ink was obtained. In this regard, the 20-degree gloss value of the above-described recording medium, measured by using a microhazemeter (produced by BYK-Gardner) under the condition of the incident angle of 20 degrees and the reflection angle of 20 degrees, was 40.1.

The "predetermined image" obtained as described above was dried by standing at room temperature for one day, so that a recorded material for measurement was produced. The measurement of the recorded material concerned was performed by using Gonio-Spectrophotometric Color measurement system (Model GCMS-3B; produced by MURAKAMI COLOR RESEARCH LABORATORY) under the condition of the light source of D65, the view angle of 2 degrees, the incident angle of 45 degrees, the reflection angle of 45 degrees, the flapping angle of 0 degrees, and the in-plane rotation angle of 0 degrees. The tristimulus value of the illumination light was obtained by measuring a barium sulfate plate under the same condition. Then, the bronze value B was calculated from the resulting values on the basis of Formula 1 described above. Furthermore, the 20-degree gloss value GB was measured by using a microhazemeter (produced by BYK-Gardner) under the condition of the incident angle of 20 degrees and the reflection angle of 20 degrees. The results are shown in Table 4.

TABLE 4

| Individual values of control ink | | |
|---|---|---|
| | Bronze value B | 20-Degree gloss value |
| Ink 1 | 32.46 | 44.1 |
| Ink 2 | 13.41 | 56.9 |
| Ink 3 | 9.45 | 76.4 |
| Ink 4 | 2.65 | 43.8 |

Measurement of Individual Values of Individual Inks of Examples and Comparative Examples The inks of Examples 1 to 6 and Comparative examples 1 to 10 obtained as described above were used, and the calculation of the bronze value B and the measurement of the 20-degree gloss value GB were performed in a manner similar to those in the case of Control inks 1 to 4. Moreover, recorded materials were obtained in a manner similar to that in the case of the control ink. Subsequently, the measurement of the recorded material concerned was performed by using Gonio-Spectrophotometric Color measurement system (Model GCMS-3B; produced by MURAKAMI COLOR RESEARCH LABORATORY) under the condition of the light source of D65, the view angle of 2 degrees, the incident angle of 45 degrees, the reflection angle of 0 degrees, the flapping angle of 0 degrees, and the in-plane rotation angle of 0 degrees. The tristimulus value of the illumination light was obtained by measuring a barium sulfate plate under the same condition. Then, the saturation value C was calculated from the resulting values on the basis of Formula 2 described above. Furthermore, each recorded material was observed visually and the bronze resistance, the glossiness, and the saturation were evaluated on the basis of the following individual evaluation criteria. The obtained results are shown in Table 5.

Evaluation Criteria of Bronze Resistance
A: The bronze value B was 0.0 or more, and 12.0 or less, and a bronze phenomenon was hardly recognized.
B: The bronze value B exceeded 12.0, a bronze phenomenon was recognized remarkably, and the level was unacceptable.

Evaluation Criteria of Glossiness
A: The feeling of glossiness was at a good level.
B: The feeling of glossiness was slightly poor, but the level was acceptable.
C: The feeling of glossiness was poor apparently, and the level was unacceptable.

Evaluation Criteria of Saturation
A: The color reproducibility was excellent, and the level was good.
B: The color reproducibility was poor, and the level was unacceptable.

below is 65.0 or more, and the 20-degree gloss value GB is 30.0 or more with respect to a predetermined recorded image recorded by the ink $$a^*_{45} = 500\left[f\left(\frac{Xx_{45}}{Xs_{45}}\right) - f\left(\frac{Yx_{45}}{Ys_{45}}\right)\right],$$ Formula 1

$$b^*_{45} = 200\left[f\left(\frac{Yx_{45}}{Ys_{45}}\right) - f\left(\frac{Zx_{45}}{Zs_{45}}\right)\right]$$

$$B = (a^{*2}_{45} + b^{*2}_{45})^{\frac{1}{2}}$$

wherein $Xx_{45}$, $Yx_{45}$, and $Zx_{45}$ are tristimulus values of reflected light of illumination in the direction of specular reflection, the illumination is in the direction of an angle of 45 degrees to a normal to the image, $Xs_{45}$, $Ys_{45}$, and $Zs_{45}$ are

TABLE 5

| | Evaluation result | | | | | | | |
|---|---|---|---|---|---|---|---|---|
| | | | Bronze resistance | | Glossiness 20-Degree | | Saturation | |
| | Relationship in GB value | Relationship in B value | Bronze value B | Evaluation result | gloss value GB | Evaluation result | Saturation value C | Evaluation result |
| Example 1 | $GB_A < GB_B$ | $B_A > B_B$ | 10.2 | A | 48.2 | A | 76.3 | A |
| Example 2 | $GB_A < GB_B$ | $B_A > B_B$ | 8.99 | A | 40.3 | A | 80.9 | A |
| Example 3 | $GB_A < GB_B$ | $B_A > B_B$ | 7.37 | A | 77.1 | A | 66.9 | A |
| Example 4 | $GB_A < GB_B$ | $B_A > B_B$ | 2.82 | A | 47.3 | A | 79.7 | A |
| Example 5 | $GB_A < GB_B$ | $B_A > B_B$ | 8.62 | A | 56.1 | A | 82.4 | A |
| Example 6 | $GB_A > GB_B$ | $B_A > B_B$ | 7.59 | A | 30.8 | B | 89.2 | A |
| Comparative example 1 | $GB_A < GB_B$ | $B_A > B_B$ | 11.9 | A | 75.2 | A | 53.0 | B |
| Comparative example 2 | $GB_A < GB_B$ | $B_A > B_B$ | 13.6 | B | 48.9 | A | 89.1 | A |
| Comparative example 3 | $GB_A > GB_B$ | $B_A > B_B$ | 7.00 | A | 28.5 | C | 89.5 | A |
| Comparative example 4 | — | — | 37.9 | B | 70.4 | A | 94.3 | A |
| Comparative example 5 | — | — | 19.4 | B | 58.0 | A | 87.1 | A |
| Comparative example 6 | — | — | 13.6 | B | 49.7 | A | 72.2 | A |
| Comparative example 7 | — | — | 32.5 | B | 79.0 | A | 74.0 | A |
| Comparative example 8 | — | — | 44.5 | B | 98.0 | A | 73.2 | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-017790 filed Jan. 29, 2010, which is hereby incorporated by reference herein in its entirety.

What is claimed is:

1. An ink comprising a plurality of organic pigments having hues forming an angle of 10 degrees or more with one another,
wherein the bronze value B calculated by Formula 1 described below is 0.0 or more, and 12.0 or less, the saturation value C calculated by Formula 2 described tristimulus values of illumination light under the same condition of the illumination, and these tristimulus values satisfy the following formulas:

$$f\left(\frac{Xx_{45}}{Xs_{45}}\right) = \left(\frac{Xx_{45}}{Xs_{45}}\right)^{\frac{1}{3}} \text{ where } \frac{Xx_{45}}{Xs_{45}} > 0.008856$$

$$f\left(\frac{Xx_{45}}{Xs_{45}}\right) = 7.78\frac{Xx_{45}}{Xs_{45}} + \frac{16}{116} \text{ where } \frac{Xx_{45}}{Xs_{45}} \leq 0.008856$$

$$f\left(\frac{Yx_{45}}{Ys_{45}}\right) = \left(\frac{Yx_{45}}{Ys_{45}}\right)^{\frac{1}{3}} \text{ where } \frac{Yx_{45}}{Ys_{45}} > 0.008856$$

$$f\left(\frac{Yx_{45}}{Ys_{45}}\right) = 7.78\frac{Yx_{45}}{Ys_{45}} + \frac{16}{116} \text{ where } \frac{Yx_{45}}{Ys_{45}} \leq 0.008856$$

$$f\left(\frac{Zx_{45}}{Zs_{45}}\right) = \left(\frac{Zx_{45}}{Zs_{45}}\right)^{\frac{1}{3}} \text{ where } \frac{Zx_{45}}{Zs_{45}} > 0.008856$$

$$f\left(\frac{Zx_{45}}{Zs_{45}}\right) = 7.78\frac{Zx_{45}}{Zs_{45}} + \frac{16}{116} \text{ where } \frac{Zx_{45}}{Zs_{45}} \leq 0.008856$$

-continued $$a_0^* = 500\left[f\left(\frac{Xx_0}{Xs_0}\right) - f\left(\frac{Yx_0}{Ys_0}\right)\right],$$ Formula 2

$$b_0^* = 200\left[f\left(\frac{Yx_0}{Ys_0}\right) - f\left(\frac{Zx_0}{Zs_0}\right)\right]$$

$$C = (a_0^{*2} + b_0^{*2})^{\frac{1}{2}}$$

wherein $Xx_0$, $Yx_0$, and $Zx_0$ are tristimulus values of reflected light of illumination in the direction of a normal to the image, the illumination is in the direction of an angle of 45 degrees to the normal, $Xs_0$, $Ys_0$, and $Zs_0$ are tristimulus values of illumination light under the same condition of the illumination, and these tristimulus values satisfy the following formulas:

$$f\left(\frac{Xx_0}{Xs_0}\right) = \left(\frac{Xx_0}{Xs_0}\right)^{\frac{1}{3}} \text{ where } \frac{Xx_0}{Xs_0} > 0.008856$$

$$f\left(\frac{Xx_0}{Xs_0}\right) = 7.78\frac{Xx_0}{Xs_0} + \frac{16}{116} \text{ where } \frac{Xx_0}{Xs_0} \le 0.008856$$

$$f\left(\frac{Yx_0}{Ys_0}\right) = \left(\frac{Yx_0}{Ys_0}\right)^{\frac{1}{3}} \text{ where } \frac{Yx_0}{Ys_0} > 0.008856$$

$$f\left(\frac{Yx_0}{Ys_0}\right) = 7.78\frac{Yx_0}{Ys_0} + \frac{16}{116} \text{ where } \frac{Yx_0}{Ys_0} \le 0.008856$$

$$f\left(\frac{Zx_0}{Zs_0}\right) = \left(\frac{Zx_0}{Zs_0}\right)^{\frac{1}{3}} \text{ where } \frac{Zx_0}{Zs_0} > 0.008856$$

$$f\left(\frac{Zx_0}{Zs_0}\right) = 7.78\frac{Zx_0}{Zs_0} + \frac{16}{116} \text{ where } \frac{Zx_0}{Zs_0} \le 0.008856.$$

wherein the plurality of organic pigments are two types of pigments of a pigment A and a pigment B, and with respect to individual predetermined recorded images recorded by a first control ink containing only the pigment A as a coloring material and a second control ink containing only the pigment B as a coloring material, the relationships $B_A > B_B$ and $GB_A < GB_B$ are satisfied, where the bronze values of the individual images are assumed to be $B_A$ and $B_B$, respectively, and the GB values of the individual images are assumed to be $GB_A$ and $GB_B$, respectively.

2. An ink cartridge comprising an ink storage portion to store an ink, wherein the ink stored in the ink storage portion is the ink according to claim 1.

3. An ink-jet recording method comprising the step of ejecting an ink from an ink-jet method recording head to perform recording on a recording medium, wherein the ink according to claim 1 is used.

4. A method for preparing an ink containing a plurality of organic pigments having hues forming an angle of 10 degrees or more with one another, the method comprising;

selecting a plurality of pigments, wherein the plurality of organic pigments are two types of pigments of a pigment A and a pigment B, determining whether, with respect to individual predetermined recorded images recorded by a first control ink containing only the pigment A as a coloring material and a second control ink containing only the pigment B as a coloring material the relationships $B_A > B_B$ and $GB_A < GB_B$ are satisfied where the bronze values of the individual images are assumed to be $B_A$ and $B_B$, respectively, and are defined by Formula 1 described below, and the GB values of the individual images are assumed to be $GB_A$ and $GB_B$, respectively, and are the 20-degree gloss values, and combining the plurality of selected pigments to formulate the ink in such a way that the bronze value B calculated by Formula 1 described below becomes 0.0 or more, and 12.0 or less, the saturation value C calculated by Formula 2 described below becomes 65.0 or more, and the 20-degree gloss value GB becomes 30.0 or more with respect to a predetermined recorded image recorded by the ink, so as to prepare the ink $$a_{45}^* = 500\left[f\left(\frac{Xx_{45}}{Xs_{45}}\right) - f\left(\frac{Yx_{45}}{Ys_{45}}\right)\right],$$ Formula 1

$$b_{45}^* = 200\left[f\left(\frac{Yx_{45}}{Ys_{45}}\right) - f\left(\frac{Zx_{45}}{Zs_{45}}\right)\right]$$

$$B = (a_{45}^{*2} + b_{45}^{*2})^{\frac{1}{2}}$$

wherein $Xx_{45}$, $Yx_{45}$, and $Zx_{45}$ are tristimulus values of reflected light of illumination in the direction of specular reflection, the illumination is in the direction of an angle of 45 degrees to a normal to the image, $Xs_{45}$, $Ys_{45}$, and $Zs_{45}$ are tristimulus values of illumination light under the same condition of the illumination, and these tristimulus values satisfy the following formulas:

$$f\left(\frac{Xx_{45}}{Xs_{45}}\right) = \left(\frac{Xx_{45}}{Xs_{45}}\right)^{\frac{1}{3}} \text{ where } \frac{Xx_{45}}{Xs_{45}} > 0.008856$$

$$f\left(\frac{Xx_{45}}{Xs_{45}}\right) = 7.78\frac{Xx_{45}}{Xs_{45}} + \frac{16}{116} \text{ where } \frac{Xx_{45}}{Xs_{45}} \le 0.008856$$

$$f\left(\frac{Yx_{45}}{Ys_{45}}\right) = \left(\frac{Yx_{45}}{Ys_{45}}\right)^{\frac{1}{3}} \text{ where } \frac{Yx_{45}}{Ys_{45}} > 0.008856$$

$$f\left(\frac{Yx_{45}}{Ys_{45}}\right) = 7.78\frac{Yx_{45}}{Ys_{45}} + \frac{16}{116} \text{ where } \frac{Yx_{45}}{Ys_{45}} \le 0.008856$$

$$f\left(\frac{Zx_{45}}{Zs_{45}}\right) = \left(\frac{Zx_{45}}{Zs_{45}}\right)^{\frac{1}{3}} \text{ where } \frac{Zx_{45}}{Zs_{45}} > 0.008856$$

$$f\left(\frac{Zx_{45}}{Zs_{45}}\right) = 7.78\frac{Zx_{45}}{Zs_{45}} + \frac{16}{116} \text{ where } \frac{Zx_{45}}{Zs_{45}} \le 0.008856$$

$$a_0^* = 500\left[f\left(\frac{Xx_0}{Xs_0}\right) - f\left(\frac{Yx_0}{Ys_0}\right)\right],$$ Formula 2

$$b_0^* = 200\left[f\left(\frac{Yx_0}{Ys_0}\right) - f\left(\frac{Zx_0}{Zs_0}\right)\right]$$

$$C = (a_0^{*2} + b_0^{*2})^{\frac{1}{2}}$$

wherein $Xx_0$, $Yx_0$, and $Zx_0$ are tristimulus values of reflected light of illumination in the direction of a normal to the image, the illumination is in the direction of an angle of 45 degrees to the normal, $Xs_0$, $Ys_0$, and $Zs_0$ are tristimulus values of illumination light under the same condition of the illumination, and these tristimulus values satisfy the following formulas:

$$f\left(\frac{Xx_0}{Xs_0}\right) = \left(\frac{Xx_0}{Xs_0}\right)^{\frac{1}{3}} \text{ where } \frac{Xx_0}{Xs_0} > 0.008856$$

$$f\left(\frac{Xx_0}{Xs_0}\right) = 7.78\frac{Xx_0}{Xs_0} + \frac{16}{116} \text{ where } \frac{Xx_0}{Xs_0} \le 0.008856$$

$$f\left(\frac{Yx_0}{Ys_0}\right) = \left(\frac{Yx_0}{Ys_0}\right)^{\frac{1}{3}} \text{ where } \frac{Yx_0}{Ys_0} > 0.008856$$

$$f\left(\frac{Yx_0}{Ys_0}\right) = 7.78\frac{Yx_0}{Ys_0} + \frac{16}{116} \text{ where } \frac{Yx_0}{Ys_0} \le 0.008856$$

-continued $$f\left(\frac{Zx_0}{Zs_0}\right) = \left(\frac{Zx_0}{Zs_0}\right)^{\frac{1}{3}} \text{ where } \frac{Zx_0}{Zs_0} > 0.008856$$

$$f\left(\frac{Zx_0}{Zs_0}\right) = 7.78\frac{Zx_0}{Zs_0} + \frac{16}{116} \text{ where } \frac{Zx_0}{Zs_0} \leq 0.008856.$$

5. The ink according to claim 1, wherein the total content of the organic pigments in the ink is 2.0 percent by mass or more, and 10.0 percent by mass or less with reference to the total mass of the ink.

6. The ink according to claim 1, wherein the mass ratio of the content of the pigment having the largest content in the plurality of organic pigments in the ink to the total content of pigments other than the pigment having the largest content is within the range of 4:1 to 1:1.

7. The ink according to claim 1, wherein the plurality of organic pigments is selected from the group consisting of: C. I. Pigment Yellow: 12, 13, 14, 17, 20, 24, 74, 83, 86, 93, 97, 109, 110, 117, 120, 125, 128, 137, 138, 147, 148, 150, 151, 153, 154, 166, 168, 180, and 185; C. I. Pigment Orange: 16, 36, 43, 51, 55, 59, 61, and 71; C. I. Pigment Red: 9, 48, 49, 52, 53, 57, 97, 122, 123, 149, 168, 175, 176, 177, 180, 192, 215, 216, 217, 220, 223, 224, 226, 227, 228, 238, 240, 254, 255, and 272; C. I. Pigment Violet: 19, 23, 29, 30, 32, 37, 40, and 50; C. I. Pigment Blue: 15, 15:1, 15:3, 15:4, 15:6, 22, 60, and 64; C. I. Pigment Green: 7 and 36, and C. I. Pigment Brown: 23, 25, and 26.

8. The ink according to claim 1, wherein the plurality of organic pigments is selected from the group consisting of C.I. Pigment Blue 15:3, C.I. Pigment Red 122, C.I. Pigment Yellow 74 and C.I. Pigment Yellow 128.

\* \* \* \* \*